United States Patent
Wu et al.

(10) Patent No.: US 11,638,971 B2
(45) Date of Patent: May 2, 2023

(54) GRAIN-ORIENTED SILICON STEEL WITH LOW CORE LOSS AND MANUFACTURING METHOD THEREFORE

(71) Applicant: BAOSHAN IRON & STEEL CO., LTD., Shanghai (CN)

(72) Inventors: Meihong Wu, Shanghai (CN); Zipeng Zhao, Shanghai (CN); Guobao Li, Shanghai (CN); Kanyi Shen, Shanghai (CN); Zhuochao Hu, Shanghai (CN); Chen Ling, Shanghai (CN); Huande Sun, Shanghai (CN); Huabing Zhang, Shanghai (CN)

(73) Assignee: BAOSHAN IRON & STEEL CO., LTD., Shanghai (CN)

( * ) Notice: Subject to any disclaimer, the term of this patent is extended or adjusted under 35 U.S.C. 154(b) by 496 days.

(21) Appl. No.: 16/496,541

(22) PCT Filed: Jan. 24, 2018

(86) PCT No.: PCT/CN2018/074017
§ 371 (c)(1),
(2) Date: Sep. 23, 2019

(87) PCT Pub. No.: WO2018/177006
PCT Pub. Date: Oct. 4, 2018

(65) Prior Publication Data
US 2021/0101230 A1    Apr. 8, 2021

(30) Foreign Application Priority Data
Mar. 27, 2017 (CN) .......................... 201710188472.8

(51) Int. Cl.
*B23K 26/364* (2014.01)
*B23K 26/359* (2014.01)
(Continued)

(52) U.S. Cl.
CPC .......... *B23K 26/364* (2015.10); *B23K 26/359* (2015.10); *B23K 26/40* (2013.01); *C22C 38/02* (2013.01); *B23K 2103/04* (2018.08)

(58) Field of Classification Search
CPC .... B23K 26/364; B23K 26/359; B23K 26/40; B23K 2103/04; C22C 38/02; H01F 1/16
(Continued)

(56) References Cited

U.S. PATENT DOCUMENTS 4,363,677 A * 12/1982 Ichiyama ............. C21D 8/1294
  428/677
4,456,812 A *  6/1984 Neiheisel ............. C21D 8/1294
  148/903
(Continued)

FOREIGN PATENT DOCUMENTS

CN   101979676       2/2011
CN   102941413 A     2/2013
(Continued)

OTHER PUBLICATIONS

International Search Report and Written Opinion dated Apr. 28, 2018 for PCT Patent Application PCT/CN2018/074017.
(Continued)

*Primary Examiner* — Jimmy Chou
(74) *Attorney, Agent, or Firm* — Lei Fang, Esq.; Smith Tempel Blaha LLC

(57) ABSTRACT

A grain-oriented silicon steel with low iron loss, wherein the silicon steel is provided with a plurality of grooves on its surface, each of the grooves is 10-60 μm in width and 5-40 μm in depth, and the spacing between adjacent grooves is 1-10 mm. The manufacturing method therefor comprises: scoring the surface of the grain-oriented silicon steel with low iron loss by using a laser in order to form the grooves. The grain-oriented silicon steel with low iron loss can
(Continued)

maintain the magnetic domain refining effect in a stress-relief annealing process, and avoid the introduction of more residual stress.

9 Claims, 5 Drawing Sheets

(51) Int. Cl.
    *B23K 26/40*     (2014.01)
    *C22C 38/02*     (2006.01)
    *B23K 103/04*     (2006.01)

(58) Field of Classification Search
    USPC .................. 148/111, 112, 113; 219/121.85
    See application file for complete search history.

(56) References Cited

U.S. PATENT DOCUMENTS

| | | | | |
|---|---|---|---|---|
| 4,750,949 | A * | 6/1988 | Kobayashi | B23P 15/00 |
| | | | | 148/113 |
| 5,203,928 | A * | 4/1993 | Inokuti | C21D 8/1294 |
| | | | | 148/112 |
| 6,228,182 | B1 * | 5/2001 | Nakano | H01F 1/14783 |
| | | | | 148/112 |
| 6,368,424 | B1 * | 4/2002 | Sakai | H01F 1/16 |
| | | | | 148/120 |
| 6,482,271 | B2 * | 11/2002 | Sakai | C21D 8/1294 |
| | | | | 148/121 |
| 9,536,658 | B2 * | 1/2017 | Omura | C22C 38/00 |
| 9,646,749 | B2 * | 5/2017 | Suehiro | C22C 38/00 |
| 9,984,800 | B2 * | 5/2018 | Takajo | C21D 8/1294 |
| 10,131,018 | B2 * | 11/2018 | Hirano | B23K 26/082 |
| 10,147,527 | B2 * | 12/2018 | Takajo | B23K 26/354 |
| 11,387,025 | B2 * | 7/2022 | Omura | H01F 1/147 |
| 2002/0011278 | A1 * | 1/2002 | Komatsubara | C22C 38/34 |
| | | | | 148/120 |
| 2009/0114316 | A1 * | 5/2009 | Sakai | B23K 26/0626 |
| | | | | 148/100 |
| 2010/0243629 | A1 * | 9/2010 | Sakai | H01F 1/16 |
| | | | | 219/121.85 |
| 2013/0161301 | A1 * | 6/2013 | Okabe | C22C 38/002 |
| | | | | 219/121.85 |
| 2015/0059932 | A1 * | 3/2015 | Hirano | C22C 38/001 |
| | | | | 148/306 |
| 2015/0132547 | A1 * | 5/2015 | Inoue | C21D 6/005 |
| | | | | 148/112 |
| 2015/0357101 | A1 * | 12/2015 | Zaizen | C21D 8/1222 |
| | | | | 148/111 |
| 2016/0333435 | A1 * | 11/2016 | Inoue | B23K 26/0006 |
| 2018/0037965 | A1 * | 2/2018 | Takajo | H01F 27/245 |

FOREIGN PATENT DOCUMENTS

| | | | | |
|---|---|---|---|---|
| CN | 106282512 | | 1/2017 | |
| CN | 106282512 | A * | 1/2017 | |
| CN | 106282512 | A1 * | 1/2017 | ............... C21D 8/12 |
| EP | 0584610 | | 3/1994 | |
| EP | 0892072 | A1 | 1/1999 | |
| JP | H06100939 | A | 4/1994 | |
| JP | H08269557 | A | 10/1996 | |
| JP | H08269559 | A | 10/1996 | |
| JP | 2000026942 | A | 1/2000 | |
| JP | 2003129135 | | 5/2003 | |
| JP | 2012087332 | A | 5/2012 | |

OTHER PUBLICATIONS

1st Office Action dated May 5, 2019 for Chinese Patent Application No. 201710188472.8.
2nd Office Action dated Nov. 27, 2019 for Chinese Patent Application No. 201710188472.8.
1st Office Action dated Dec. 15, 2020 for Japanese Patent Application No. 2019552141.
1st Office Action dated Feb. 5, 2021 for Korean Patent Application No. 20197027836.
European Search Report dated Sep. 24, 2020 for European Patent Application No. 18/776,052.

* cited by examiner

GRAIN-ORIENTED SILICON STEEL WITH LOW CORE LOSS AND MANUFACTURING METHOD THEREFORE

CROSS-REFERENCE TO RELATED APPLICATIONS

This application is a 371 U.S. National Phase of PCT International Application No. PCT/CN2018/074017 filed on Jan. 24, 2018, which claims benefit and priority to Chinese patent application no. 201710188472.8.3, filed on Mar. 27, 2017. Both of the above-referenced applications are incorporated by reference herein in their entireties.

TECHNICAL FIELD

The invention relates to a steel grade and a manufacturing method thereof, in particular to a silicon steel and a manufacturing method thereof.

BACKGROUND ART

In recent years, global energy and environmental issues have become increasingly prominent, and the demand for energy conservation and consumption reduction is increasing worldwide. As a result, energy consumption standards of equipment have been generally raised in countries in order to reduce the reactive power consumption of various types of equipments. At present, transformers, as a basic component of power transmission systems, account for about 40% of the loss of the power transmission system. The loss of the transformer core made of grain-oriented silicon steel material accounts for about 20% of the total loss. Iron core loss is often referred to as iron loss. Therefore, reducing the iron loss of grain-oriented silicon steel has significant economic and social benefits.

Grain-oriented silicon steel is a ferromagnetic material, which is named because its internal grain {110}<001> orientation is substantially consistent with the direction of rolling the silicon steel into a steel plate. Due to the best magnetic permeability of grains in the {110}<001> direction, the grain-oriented silicon steel sheet has excellent magnetic properties, exhibits high magnetic permeability and low iron loss performance, and is therefore widely used in the manufacture of power transmission and distribution transformers for power transmission. The magnetic permeability of the grain-oriented silicon steel is generally characterized by B8, i.e., the magnetic flux density of the silicon steel sheet at an excitation magnetic field of 800 A/m, in unit of T. The iron loss is generally characterized by $P_{17/50}$, i.e., the ineffective electric energy consumed by magnetization when the magnetic flux density in the silicon steel plate reaches 1.7 T at an AC excitation field of 50 Hz, in unit of W/kg.

The iron loss of grain-oriented silicon steel sheet consists of three parts: hysteresis loss, eddy current loss and abnormal eddy current loss. Hysteresis loss is the energy loss caused by the magnetic hysteresis in which the variation in magnetic induction intensity falls behind the variation in the magnetic field intensity. Magnetic hysteresis is caused by the obstructions of magnetic domain wall motion and magnetic flux change in the magnetization and demagnetization of ferromagnetic materials due to factors such as inclusions, crystal defects, internal stress and crystal orientation in the materials. Eddy current loss is the energy loss caused by the eddy current and is related to the electrical conductivity and thickness of silicon steel sheet, wherein the eddy current is caused by the local electromotive force induced by the change in the magnetic flux during the alternating magnetization of the grain-oriented silicon steel sheet. Abnormal eddy current loss is the energy loss caused by the difference in magnetic domain structure when the silicon steel plate is magnetized, and is mainly affected by the width of the magnetic domain.

It is well known that the magnetic domain structure exists in the grains of grain-oriented silicon steel, formed by the combination of spontaneous magnetization and demagnetizing field. The magnetic moments of the atoms inside the magnetic domain are arranged in the same direction, so that the macroscopic crystals exhibit ferromagnetism. In the absence of an external magnetic field, magnetic domains are mainly 180° magnetic domains arranged in antiparallel. The width of a single magnetic domain can typically be on the order of tens of microns or even millimeters. A transition layer of several tens to hundreds of atomic layers exists between adjacent magnetic domains, which are named as a magnetic domain wall. During the magnetization process, the magnetic moment is rotated by the external field, and the migration of magnetic domain wall causes the adjacent magnetic domains to be mutually annexed, thereby realizing the magnetic conductive function. The width of the magnetic domain directly affects the hysteresis loss and abnormal eddy current loss of the silicon steel sheet, thereby affecting the overall iron loss performance of the silicon steel sheet. Refining the magnetic domain (i.e., reducing the width of the magnetic domain) can effectively reduce the abnormal eddy current loss, and is an important method to reduce the iron loss of the silicon steel plate, and is also one of the main development directions of the silicon steel technology.

In summary, the main methods to improve the iron loss of grain-oriented silicon steel sheets are as follows:

(1) Metallurgy method: By optimizing the composition and process parameters to obtain an improved secondary recrystallized structure and to improve the degree of orientation.

(2) Tension control: By improving the tension of the coating on the surface of the substrate to refine magnetic domains, and reduce iron loss and magnetostriction.

(3) Surface scoring: Applying continuous or intermittent scoring lines with a certain spacing to the surface of the silicon steel along the rolling direction by laser, electron beam, plasma, etc., and applying stress or strain to refine the magnetic domains and to reduce the iron loss.

In recent years, since the degree of orientation has been raised to a very high level by metallurgical methods, i.e., the orientation deviation angle of crystal grains in Hi-B steel is less than 5° on average, the space for further improvement is limited. Therefore, the key to improving the electromagnetic performance of silicon steel sheets is to improve the tension coating and scoring process.

The principle of the method of improving the iron loss of the grain-oriented silicon steel by surface scoring is that the scoring on the surface of the silicon steel can refine the magnetic domains, thereby reducing the iron loss. Scoring techniques can be divided into two categories according to the effect of the scoring. One type is the scoring technique that is not resistant to stress-relief annealing. In this technique, linear thermal stress regions are formed on the surface of the silicon steel at a certain interval by using a laser, a plasma beam, an electron beam, or the like, causing sub-magnetic domains around the region, thereby reducing the width of the main magnetic domain and achieving the purpose of reducing iron loss. In such a method, the refinement effect of magnetic domains disappears with the elimination of thermal stress after stress-relief annealing, and the iron loss then returns to the original level. Therefore, such method can only be used in the manufacture of laminated iron core transformers without stress-relief annealing. Another type is an scoring technique that is resistant to stress-relief annealing. The technical means currently reported include mechanical, laser beam, electrochemical corrosion and the like. The technical solution generally comprises: forming linear strain regions on the surface of grain-oriented silicon steel sheets to redistribute the internal energy of the crystal, thereby reducing the width of the main magnetic domain and reducing the iron loss. The iron loss of the grain-oriented silicon steel sheet produced by such a method does not deteriorate after stress-relief annealing. Therefore, the silicon steel sheet produced by such a method can be applied to the manufacturing of a wound core transformer requiring stress-relief annealing.

U.S. patent document titled "Method for Indirect-electrification-type Continuous Electrolytic Etching of Metal Strip and Apparatus for Indirect-electrification-type Continuous Electrolytic Etching" (Publication No. US2003/0164307A1, Publication date: Sep. 4, 2003) disclosed a method for Indirect-electrification-type continuous electrolytic etching of a metal strip. In technical solutions disclosed in this patent document, heat-resistant scored silicon steel sheet is formed by using electrolytic etching. First, the grain-oriented silicon steel plate having an underlayer is linearly processed by using methods such as a laser to expose the metal substrate in the region. The grain-oriented silicon steel sheet is then immersed in the electrolyte to form an electrode pair between the silicon steel plate and the platinum electrode. The substrate is electrolytically etched by alternately controlling the positive and negative changes in the electrode potential so that the region forms linear grooves close to a rectangle.

U.S. patent document titled "Grain-oriented Electrical Steel Sheet Excellent in Magnetic Properties and Method for Producing the Same" (Publication No. US2004/0040629A1, Publication date: Mar. 4, 2004) disclosed unidirectional electromagnetic steel sheet excellent in magnetic properties and method for producing the same. In technical solutions disclosed in this patent literature, the surface of a silicon steel plate before or after hot stretching, temper rolling and annealing is subjected to local linear heating using a laser beam to form a remelting zone. The coating material and a part of the metal substrate are melted, cooled, and solidified to form a remelting zone, and the iron loss of the silicon steel plate is reduced by controlling the width and depth of the remelting zone. Further, in the technical solutions disclosed in the patent document, the hot melt zone is formed by laser processing. Due to the high melting point and thermal conductivity of the metal, laser processing to material melting requires the injection of extremely high energy. Thermal diffusion causes the steel sheet to form thermal stress over a wide range and must be annealed before use.

U.S. patent document titled "GRAIN-ORIENTED ELECTRICAL STEEL SHEET AND METHOD OF MANUFACTURING THE SAME" (Publication No. US2013/0139932A1, Publication date: Jun. 6, 2013) disclosed a method of manufacturing grain-oriented electromagnetic steel sheet. In the technical solutions disclosed in this patent document, grooves having a certain depth are formed on the surface of the silicon steel by using a continuous laser and controlling the beam energy density of the laser. After the secondary recrystallization annealing, equiaxed crystal regions are formed in the thickness direction of the steel sheet below the grooves. Since the equiaxed crystal has a different orientation from Gauss, the equiaxed crystal regions hinder the further growth of the secondary recrystallized grains in this region during the high temperature annealing, and thus reduce the size of the secondary recrystallized grains and refine the magnetic domains.

SUMMARY OF THE INVENTION

One of the objects of the present invention is to provide grain-oriented silicon steel with low iron loss. The grain-oriented silicon steel with low iron loss can maintain the magnetic domain refining effect in a stress-relief annealing process, and avoid the introduction of more residual stress. The grain-oriented silicon steel with low iron loss is particularly suitable for direct use in the manufacture of laminated core transformers without stress-relief annealing, and is also applicable to the manufacture of wound core transformers.

Based on the above object, the present invention provides a grain-oriented silicon steel with low iron loss, wherein the surface of the grain-oriented silicon steel has a plurality of grooves, each groove is 10-60 μm in width and 5-40 μm in depth, and the spacing between adjacent grooves is 1-10 mm.

In the technical solutions of the present invention, a series of grooves are formed on the surface of the grain-oriented silicon steel to refine the magnetic domains. Also, since the grooves are not changed by annealing, the effect of reducing the iron loss does not disappear in the stress-relief annealing. Therefore, the grain-oriented silicon steel of the present invention is particularly suitable for wound cores.

The grain-oriented silicon steel is an electrical steel sheet having a certain silicon content and an easy magnetization direction being substantially the same as the rolling direction of the manufacturing process. There are 180° magnetic domains in the same direction as the easy magnetization direction of the grains in the grain-oriented silicon steel sheet. During AC magnetization, the magnetic poles in the steel plate realize rapid rotation by the movement of the magnetic domain walls. Therefore, the grain-oriented silicon steel has good magnetic permeability, which means that a high magnetic induction can be achieved with a small magnetizing force, and the iron loss is low. Therefore, the transformer made of the grain-oriented silicon steel has high magnetic permeability and low iron loss. The general manufacturing process for grain-oriented silicon steel is as follows. A Si-containing steel material is subjected to iron making, steel making, continuous casting, and then subjected to hot rolling process. Next, single cold rolling or double cold rollings with intermediate annealing is performed to roll the steel material to a desired thickness. Then, decarburization annealing is performed to obtain a primary recrystallized steel plate having an oxide film on its surface. Then, the steel plate is coated with a MgO-based separator on the surface, and subjected to high-temperature annealing for 20 hours or more, forming a silicon steel plate having a secondary recrystallization structure. Then, hot stretching, temper rolling and annealing are performed, a coating is applied and a baking process is performed, producing a finished grain-oriented silicon steel sheet. The obtained grain-oriented silicon steel sheet has characteristics of high magnetic induction and low iron loss, and can be used for the manufacture of transformer cores.

Since the refinement of the magnetic domain can reduce the abnormal eddy current loss of the silicon steel sheet, a micro-linear thermal stress region substantially perpendicular to the rolling direction is applied to the surface of the grain-oriented silicon steel sheet by laser or electron beam or the like. The stress results in a 90° magnetic domain perpendicular to the rolling direction in its vicinity, so that the width of the 180° magnetic domain is reduced, and the iron loss of the grain-oriented silicon steel sheet is thus reduced. For above reasons, this type of silicon steel sheet has been widely used in the manufacture of various laminated iron core transformers.

With the increasing demand for energy saving and environmental protection, wound core transformers are gradually gaining favor from the market. Since the silicon steel sheet for wound core is wound in the easy magnetization direction of the steel sheet, it has advantages of low loss, low noise, no shear waste and the like compared with laminated iron cores, and is particularly suitable for the manufacture of small and medium energy-saving transformers. However, the internal stress generated in the grain-oriented silicon steel sheet during winding process causes the deterioration of the iron loss performance of the silicon steel plate. Therefore, the iron core must be subjected to stress-relief annealing. However, for a conventional grain-oriented silicon steel sheet in which the magnetic domains are refined by generating linear stress regions using a laser or electron beam, the refinement effect of the magnetic domains disappears with the elimination of the stress after the stress-relief annealing. Therefore, such grain-oriented silicon steel sheet is not suitable for the manufacture of wound core transformers.

In order to effectively reduce the iron loss of the grain-oriented silicon steel, the inventors of the present invention conducted a lot of experimental research and found that the width and depth of the groove have an influence on the iron loss. Specifically, when the depth of the groove is less than 5 µm, the iron loss of the silicon steel sheet cannot be significantly improved. When the depth of the groove is greater than 40 µm, the magnetic induction is significantly reduced due to excessive magnetic flux leakage in the groove region, which affects the magnetic permeability of the grain-oriented silicon steel. When the spacing between adjacent grooves is less than 1 mm, the magnetic induction of the grain-oriented silicon steel is significantly reduced due to the excessively dense grooves. When the spacing between adjacent grooves is greater than 10 mm, the area affected by the refinement effect of magnetic domain is too small, and thus the iron loss of the grain-oriented silicon steel cannot be significantly improved.

Further, in order to allow the grain-oriented silicon steel sheet with low iron loss according to the present invention to be directly applied to the manufacture of a laminated core transformer or a wound core transformer, it is necessary to strictly control the width of the groove. When the width of the groove is larger than 60 µm, the corrosion resistance of the grain-oriented silicon steel with low iron loss is deteriorated, leading to a risk of corrosion breakover in the use environment of the transformer. When the width of the groove is less than 10 µm, the refinement effect of the groove on the magnetic domain is limited, the iron loss of the grain-oriented silicon steel cannot be reduced, and the production process is difficult due to the too small width.

Therefore, in the grain-oriented silicon steel with low iron loss according to the present invention, the size of the groove is defined as: each groove is 10-60 µm in width and 5-40 µm in depth, and the spacing between adjacent grooves is 1-10 mm.

It should be noted that in the technical solutions described in the present invention, the grooves are formed by a heat-resistant scoring technique. The heat-resistant scoring technique refers to a technique in which grooves are formed on the surface of the steel sheet by a certain means such as chemical erosion and mechanical pressure. The generation of the free magnetic pole at the groove increases the magnetostatic energy and reduces the domain wall energy, thereby reducing the width of the magnetic domain, refining the magnetic domain, and reducing the iron loss. Since the groove does not change due to annealing, the reduction effect of the iron loss does not disappear during the stress-relief annealing process. Therefore, the heat-resistant scoring technique is particularly suitable for manufacturing a wound core.

Further, in the grain-oriented silicon steel with low iron loss according to the present invention, an angle formed between the groove and the width direction of the steel sheet is not more than 30°. This is because the main magnetic domain in the grain-oriented silicon steel is 180°, when the angle between the groove and the width direction of the steel sheet is more than 30°, an effective magnetic domain refining effect cannot be produced to reduce the iron loss of the silicon steel sheet. At the same time, the overlarge angle causes the length of the groove to increase, resulting in a decrease in the production efficiency of the oriented silicon steel.

Further, in the oriented silicon steel with low iron loss according to the present invention, the grooves are formed by laser scoring. The electrochemical method for forming grooves is complicated in process and has a certain degree of contamination. Moreover, in the method of forming grooves by mechanical pressure or laser fusion, since the pressure of the toothed roll or the significant thermal diffusion effect during scoring causes a large amount of residual stress in the metal matrix, it is necessary to perform stress-relief annealing to obtain a grain-oriented silicon steel having a reduced iron loss. Therefore, these conventional methods are not suitable for the manufacture of laminated core transformers.

The inventors have found through research that since a high-energy density pulsed laser beam is used to carry out the heat-resistant scoring process, the thermal stress phenomenon is effectively controlled in the grooves formed by the laser scoring, and the obtained grain-oriented silicon steel has a low iron loss. Moreover, the difference between the magnetic properties of the grain-oriented silicon steel before and after stress-relief annealing is small, and the stress-relief annealing is thus not required, so the grain-oriented silicon steel can be directly used for the manufacture of laminated core transformers. In addition, the grain-oriented silicon steel is also suitable for the manufacture of a wound core transformer requiring stress-relief annealing.

Further, in the grain-oriented silicon steel with low iron loss according to the present invention, one or both surface(s) of the grain-oriented silicon steel have the grooves.

Further, in the grain-oriented silicon steel with low iron loss according to the present invention, the relative change rate of iron loss before and after stress-relief annealing is $\Delta P_{17/50}\%$, wherein $\Delta P_{17/50}\% \leq 5\%$, and wherein $$\Delta P_{17/50}\% = \frac{P_{17/50}(\text{after annealing}) - P_{17/50}(\text{before annealing})}{P_{17/50}(\text{after annealing})},$$

$P_{17/50}$ is the iron loss of the grain-oriented silicon steel sheet, in unit of W/kg.

The inventors have found through repeated experiments and detailed studies that, for grooves formed by cauterizing a material with a heat-resistant scoring technique, when $\Delta P_{17/50}\%$ is 5% or less, the range of thermal diffusion and stress generated by cauterization is small, the energy efficiency is high, and the obtained grain-oriented silicon steel with low iron loss has required width, depth and spacing of the grooves, and thus the improvement rate of iron loss reaches 6% or more. Therefore, the obtained grain-oriented silicon steel with low iron loss is suitable for the manufacture of a wound core transformer, and can be directly applied to the manufacture of a laminated core transformer without stress-relief annealing. When $\Delta P_{17/50}\%$ is more than 5%, the cauterization energy generated by the heat-resistant scoring technique is severely lost due to diffusion, and the stress inside the material is too large, and thus the groove formed is small, so that even if the iron loss of the grain-oriented silicon steel is lowered before the stress-relief annealing, the iron loss is increased to near the original level due to deterioration after annealing. Thus, the obtained grain-oriented silicon steel is not suitable for the manufacture of a wound core transformer.

Accordingly, another object of the present invention is to provide a method for producing the grain-oriented silicon steel with low iron loss as described above. The grain-oriented silicon steel with low iron loss obtained by the manufacturing method has a small difference in magnetic properties before and after stress-relief annealing, and is very suitable for the manufacture of wound core and laminated core transformers.

Based on the above object, the present invention also provides a method for producing the grain-oriented silicon steel with low iron loss as described above, comprising the steps of scoring a surface of the grain-oriented silicon steel with a laser to form grooves.

In the manufacturing method of the present invention, since the surface of the grain-oriented silicon steel is scored by a laser to form grooves, the stress distribution range near the groove is very limited and the affected region is greatly reduced, so that the grain-oriented silicon steel after stress-relief annealing does not cause a significant increase in iron loss. The reason is as follows. Since the grain-oriented silicon steel has a very high melting point and a large heat transfer coefficient, when the laser ablates the surface of the silicon steel to form grooves, the micro-region of the steel material inevitably undergoes thermal diffusion when it is irradiated with laser and reaches its melting temperature, resulting in lattice distortion and thus a wide range of thermal stress.

Further, in the manufacturing method of the present invention, the laser is one or more selected from a $CO_2$ laser, a solid laser, and a fiber laser.

Further, in the manufacturing method of the present invention, the laser has an average single-pulse instantaneous peak power density of $2.0 \times 10^6$ W/mm$^2$ or more.

Since thermal diffusion attenuates the ability of laser cauterization to form grooves, the inventors conducted extensive experiments to investigate the relationship between the heat diffusion range generated by laser ablation of materials and the average single-pulse instantaneous energy, and found that there is a significant positive correlation between the two. That is to say, when the average single-pulse instantaneous energy is high, the laser injects a large amount of energy into the micro-region of the surface of the silicon steel sheet in a short time. However, due to the limited range of thermal conduction, laser energy is mainly used to ablate materials to form grooves. Therefore, the average single-pulse instantaneous energy can be controlled to effectively control the range of heat diffusion, thereby effectively controlling the heat-affected region and the stress region, reducing the number of sub-domains thus generated, and preventing the iron loss of the grain-oriented silicon steel of the present invention from being significantly changed by stress elimination after annealing.

The duration of action of the pulsed laser on the material depends on the pulse width. However, when the pulse width is shortened, the ablation time is also shortened, resulting in a limited amount of material ablation. Therefore, it is necessary to increase the average single-pulse instantaneous energy. The average single-pulse instantaneous energy can be characterized by the average single-pulse peak instantaneous power density. The average single-pulse instantaneous peak power density $P_0$ is expressed as follows:

$$p_0 = \frac{P}{f_r \times S \times t_p}$$

Wherein P is the output power of laser in W; $f_r$ is the repetition frequency of laser in Hz; S is the spot area in mm$^2$; $t_p$ is the pulse width in s.

It can be seen from the above formula that the larger the average single-pulse instantaneous peak power density $p_0$ is, the higher the energy injected into the steel sheet by the laser in a short time is, the higher the scoring depth is and the smaller the heat affected zone is. Therefore, the effect of lowering the iron loss is more remarkable, and the change rate of the iron loss before and after the stress-relief annealing is smaller. The inventors have determined through experimental research the threshold for effectively reducing the iron loss and the change rate before and after stress-relief annealing of silicon steel. The inventors have found that when the average single-pulse instantaneous peak power density $p_0$ exceeds $2.0 \times 10^6$ W/mm$^2$, the improvement rate of the iron loss of the grain-oriented silicon steel is remarkable, and the iron loss before and after stress-relief annealing does not differ by more than 5%. However, when it is lower than the threshold value, an effective magnetic domain refining effect cannot be formed.

Further, in the manufacturing method of the present invention, the average single-pulse energy flux density $J_F$ and the pulse width $t_p$ of the laser satisfy the following relationship:

$$0.005 \leq t_p \sqrt{J_F} \leq 1$$

wherein the unit of the pulse width $t_p$ is ns; and the unit of $J_F$ is J/mm$^2$.

When grooves are formed by laser scoring, the thermal stress field of the grain-oriented silicon steel is affected by both the pulse width and the laser energy. Therefore, in order to further reduce the iron loss of the grain-oriented silicon steel, the inventors conducted detailed studies and repeated experiments and found that when the average single-pulse energy flux density $J_F$ and the pulse width $t_p$ satisfy the above relationship, the relative change rate of the iron loss of the grain-oriented silicon steel before and after stress-relief annealing $\Delta P_{17/50}\%$ does not exceed 5%.

It should be noted that the average single-pulse energy flux density $J_F$ of the laser is expressed as:

$$J_F = \frac{P}{f_r S}$$

Wherein P is the output power of the laser in W; $f_r$ is the repetition frequency of laser in Hz; S is the spot area, in mm$^2$.

The energy flux density of a laser characterizes the energy of a single-pulse laser per unit area, which directly affects the amount of heat generated during laser processing. The larger the laser energy flux density $J_F$, the more heat the laser generates, and the greater the risk of forming stress regions due to thermal diffusion. Therefore, it is necessary to shorten the action time of the laser on the material, i.e., pulse width, to reduce thermal diffusion. Moreover, the larger the laser pulse width, the longer the action time with the material during the scoring, the more likely the thermal diffusion occurs. Therefore, it is necessary to effectively control the increase in surface temperature caused by the laser, that is, to reduce the energy flux density. However, if the energy flux density is too small, the scoring efficiency is low, and it is necessary to repeat the scoring several times in order to achieve the effect of improving the iron loss.

In addition, when $t_p\sqrt{J_F}$ is less than 0.005, the processing efficiency of the laser is too low, and multiple laser scanning is required to achieve the groove size required to improve the iron loss, so that it does not have industrial practical value. When $t_p\sqrt{J_F}$ is greater than 1, the thermal stress of laser processing is remarkable, and the relative change rate of the iron loss $\Delta P_{17/50}$% before and after the stress-relief annealing is more than 5%, resulting in insufficient improvement rate of the iron loss of the grain-oriented silicon steel sheet after the stress-relief annealing. Therefore, in the manufacturing method of the present invention, the average single-pulse energy flux density $J_F$ and the pulse width $t_p$ of the laser are controlled to satisfy the following relationship:

$$0.005 \leq t_p\sqrt{J_F} \leq 1$$

Further, in the manufacturing method of the present invention, the laser has a wavelength of 1066 nm or less. The inventors studied the effect of laser wavelength on the change rate of iron loss of the grain-oriented silicon steel sheet before and after stress-relief annealing, and found that the longer the laser wavelength, the greater the thermal effect, and the greater the change rate of iron loss of the grain-oriented silicon steel sheet before and after stress-relief annealing. The reason for this phenomenon is that the grain-oriented silicon steel has different absorption rates for lasers of different wavelengths. When the wavelength of the laser is greater than 1066 nm, a large amount of heat absorption occurs during laser processing, and the material melts to form protrusions near the grooves and forms a large amount of stress inside, resulting in an increase in the change rate of iron loss before and after the stress-relief annealing of the silicon steel sheet. Therefore, in the manufacturing method of the present invention, the wavelength of the laser is controlled to 1066 nm or less.

The grain-oriented silicon steel with low iron loss of the present invention can maintain the magnetic domain refining effect in a stress-relief annealing process, and avoid the introduction of more residual stress. Thus, the grain-oriented silicon steel of the present invention is particularly suitable for use directly in the manufacture of laminated core transformers without stress relief annealing, as well as in the manufacture of wound core transformers.

DETAILED DESCRIPTION

Figure 1:
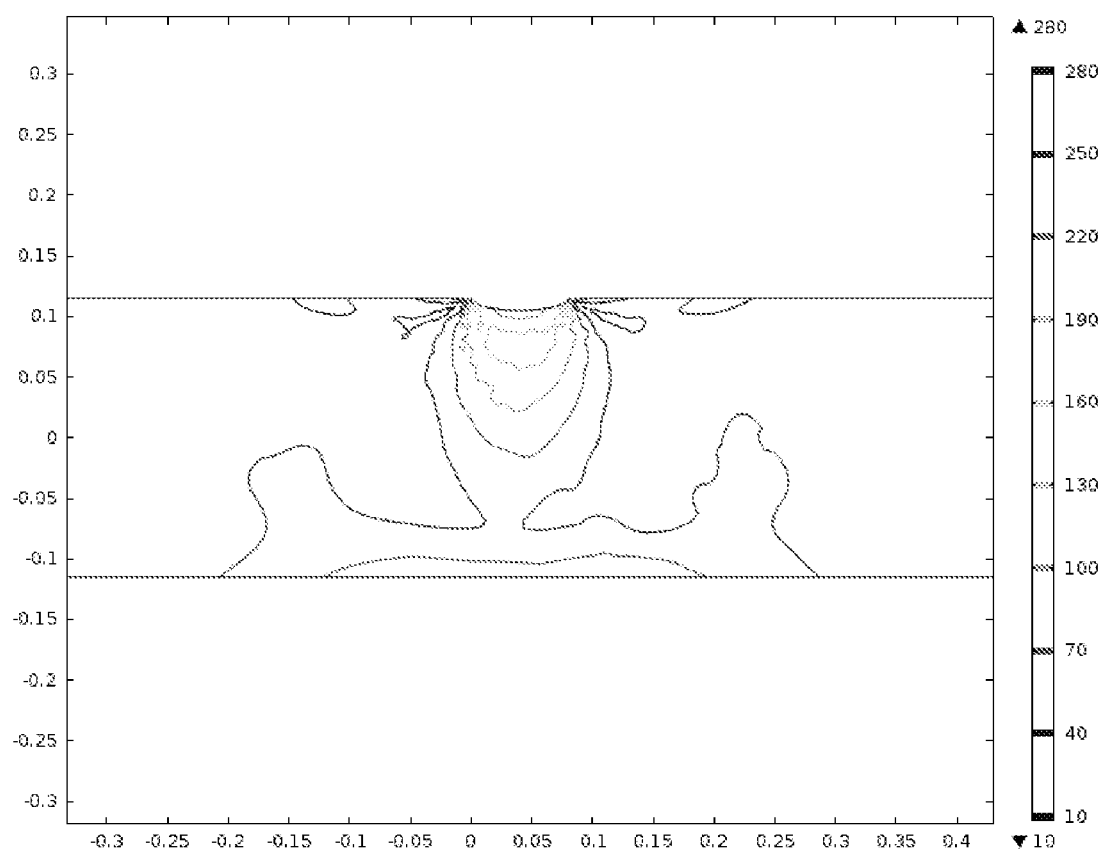
FIG. 1 shows the local stress field produced by the mechanical scoring of the prior art.

The grain-oriented silicon steel with low iron loss and manufacturing method therefor of the present invention will be further explained and illustrated below with reference to the accompanying drawings and specific Examples. However, the explanations and illustrations do not unduly limit the technical solutions of the present invention.

EXAMPLES A1-A19 AND COMPARATIVE EXAMPLES B1-B13

The grain-oriented silicon steel with low iron loss of Examples A1-A19 and the conventional grain-oriented silicon steel of Comparative Examples B1-B13 were obtained by the following steps:

(1) The raw material was subjected to iron making, steel making, continuous casting, and hot rolling process. Next, single cold rolling was performed to roll the steel to a thickness of 0.23-0.27 mm. The thicknesses of Examples A1 to A15 and Comparative Examples B1 to B10 were 0.23 mm, and the thicknesses of Examples A16 to A19 and Comparative Examples B11 to B13 were 0.27 mm. After the decarburization annealing at 850° C., the surface oxide layer was formed. Then, the steel was coated with MgO separator on the surface, and subjected to high-temperature annealing at 1200° C. for 20 hours after winding into a coil. Then, an insulating coating was applied to the surface of the steel, and final annealing was performed to obtain a finished silicon steel sheet.

(2) The surface of the silicon steel sheet of each of the Examples and the Comparative Examples was scored with a laser to form grooves. The specific process parameters are shown in Table 1.

Table 1 lists the specific process parameters in the step (2) of the grain-oriented steel with low iron loss in each Example.

TABLE 1

| | Number | Groove width (μm) | Groove depth (μm) | Spacing between adjacent grooves (mm) | Angle between groove and width direction of steel sheet | Laser source | Average single-pulse instantaneous peak power density $p_0$ (W/mm$^2$) | Pulse width $t_p$ (ns) | Average single pulse energy flux density $J_F$ (J/cm$^2$) | $t_P\sqrt{J_F}$ | Laser wavelength (nm) |
|---|---|---|---|---|---|---|---|---|---|---|---|
| Example | A1 | 20 | 20 | 5 | 10° | CO$_2$ laser | 1.3 × 10$^7$ | 0.2 | 6.63 | 0.515 | 533 |
| | A2 | 20 | 20 | 5 | 10° | Solid laser | 1.3 × 10$^7$ | 0.2 | 6.63 | 0.515 | 267 |
| | A3 | 20 | 20 | 5 | 10° | Fiber-optic laser | 1.3 × 10$^7$ | 0.2 | 6.63 | 0.515 | 267 |
| | A4 | 20 | 15 | 4 | 12° | CO$_2$ laser + Solid laser | 1.3 × 10$^7$ | 0.9 | 1.22 | 0.996 | 533 |
| | A5 | 20 | 15 | 4 | 12° | CO$_2$ laser + Fiber-optic laser | 1.1 × 10$^7$ | 0.03 | 0.03 | 0.005 | 267 |
| | A6 | 20 | 15 | 4 | 12° | Fiber-optic laser + Solid laser | 2.1 × 10$^6$ | 0.6 | 0.13 | 0.214 | 533 |
| | A7 | 43 | 20 | 4.5 | 8° | CO$_2$ laser + Solid laser + Fiber-optic laser | 4.0 × 10$^6$ | 0.2 | 1.99 | 0.282 | 267 |
| | A8 | 15 | 20 | 5 | 20° | CO$_2$ laser | 1.3 × 10$^7$ | 0.2 | 6.63 | 0.515 | 533 |
| | A9 | 10 | 18 | 4.5 | 8° | Solid laser | 1.1 × 10$^7$ | 0.2 | 5.31 | 0.461 | 267 |
| | A10 | 60 | 20 | 4.5 | 8° | Fiber-optic laser | 4.0 × 10$^7$ | 0.2 | 1.99 | 0.282 | 267 |
| | A11 | 15 | 40 | 4.5 | 8° | CO$_2$ laser + Solid laser | 1.3 × 10$^7$ | 0.2 | 6.63 | 0.515 | 267 |
| | A12 | 15 | 5 | 4.5 | 8° | CO$_2$ laser + Fiber-optic laser | 2.7 × 10$^6$ | 0.2 | 1.32 | 0.23 | 533 |
| | A13 | 15 | 20 | 1 | 8° | Fiber-optic laser + Solid laser | 1.3 × 10$^7$ | 0.2 | 6.63 | 0.515 | 267 |
| | A14 | 15 | 20 | 10 | 8° | CO$_2$ laser + Solid laser + Fiber-optic laser | 1.3 × 10$^7$ | 0.2 | 6.63 | 0.515 | 533 |
| | A15 | 15 | 20 | 5 | 30° | CO$_2$ laser | 1.3 × 10$^7$ | 0.2 | 6.63 | 0.515 | 267 |
| | A16 | 60 | 10.8 | 5 | 6° | Solid laser | 2.9 × 10$^6$ | 0.2 | 1.45 | 0.241 | 267 |
| | A17 | 50 | 12.6 | 5 | 6° | Fiber-optic laser | 3.5 × 10$^6$ | 0.2 | 1.77 | 0.266 | 267 |
| | A18 | 40 | 13.9 | 5 | 6° | CO$_2$ laser + Solid laser | 4.4 × 10$^6$ | 0.2 | 2.21 | 0.297 | 533 |
| | A19 | 20 | 16.8 | 5 | 6° | CO$_2$ laser + Fiber-optic laser | 8.8 × 10$^6$ | 0.2 | 4.43 | 0.421 | 267 |
| Comparative Example | B1 | _8 | 20 | 5 | 10° | Fiber-optic laser + Solid laser | 1.3 × 10$^7$ | 0.2 | 6.63 | 0.515 | 533 |
| | B2 | 20 | 20 | 11 | 10° | CO$_2$ laser + Solid laser + Fiber-optic laser | 1.3 × 10$^7$ | 0.2 | 6.63 | 0.515 | 267 |
| | B3 | 20 | 4 | 4 | 12° | CO$_2$ laser | 1.9 × 10$^6$ | 0.2 | 0.04 | 0.039 | 267 |
| | B4 | 20 | 15 | 13 | 12° | Solid laser | 3.4 × 10$^7$ | 0.7 | 2.39 | 1.082 | 267 |
| | B5 | 15 | 42 | 5 | 31° | Fiber-optic laser | 1.3 × 10$^7$ | 0.2 | 6.63 | 0.515 | 533 |
| | B6 | _9 | 20 | 5 | 12° | CO$_2$ laser + Solid laser | 2.0 × 10$^7$ | 0.2 | 9.95 | 0.631 | 267 |
| | B7 | 15 | 20 | 0.9 | 12° | CO$_2$ laser + Fiber laser | 1.3 × 10$^7$ | 0.2 | 6.63 | 0.515 | 267 |
| | B8 | 15 | 20 | 10.5 | 12° | Fiber-optic laser + Solid laser | 1.3 × 10$^7$ | 0.2 | 6.63 | 0.515 | 533 |
| | B9 | 15 | 41 | 5 | 12° | CO$_2$ laser + Solid laser + Fiber-optic laser | 5.3 × 10$^6$ | 0.2 | 2.66 | 0.326 | 533 |

TABLE 1-continued

| Number | Groove width (μm) | Groove depth (μm) | Spacing between adjacent grooves (mm) | Angle between groove and width direction of steel sheet | Laser source | Average single-pulse instantaneous peak power density $p_0$ (W/mm$^2$) | Pulse width $t_p$ (ns) | Average single pulse energy flux density $J_F$ (J/cm$^2$) | $t_P\sqrt{J_F}$ | Laser wavelength (nm) |
|---|---|---|---|---|---|---|---|---|---|---|
| B10 | 15 | <u>4.5</u> | 5 | 12° | CO2 laser | $2.2 \times 10^6$ | 0.2 | 1.10 | 0.21 | 267 |
| B11 | <u>61</u> | 10.5 | 5 | 6° | Solid laser | $2.8 \times 10^6$ | 0.2 | 1.42 | 0.238 | 533 |
| B12 | <u>63</u> | 10.1 | 5 | 6° | Fiber-optic laser | $2.7 \times 10^6$ | 0.2 | 1.35 | 0.232 | 267 |
| B13 | <u>70</u> | 15.5 | 5 | 6° | CO$_2$ laser + Solid laser | $2.5 \times 10^6$ | 0.2 | 1.24 | 0.223 | 533 |

The grain-oriented silicon steel with low iron loss of Examples A1-A3 and the conventional silicon steel of Comparative Example B1-B2 were made into primary energy efficient wound core distribution transformers having a capacity of 315 kVA. The design weight of the core was 430 kg, and the no-load loss and load loss were measured. The results are shown in Table 2.

TABLE 2

| Number | | Before laser scoring $P_{17/50}$ (W/kg) | After laser scoring $P_{17/50}$ (W/kg) Before annealing | After annealing | $\Delta P_{17/50}\%$ (%) | Improvement rate of iron loss of scoring(%) | No-load loss (W) | Load loss (W) |
|---|---|---|---|---|---|---|---|---|
| Example | A1 | 0.908 | 0.802 | 0.803 | 0.1 | 11.6 | 330.2 | 3045 |
| | A2 | 0.903 | 0.793 | 0.811 | 2.3 | 10.2 | 328.5 | 3038 |
| | A3 | 0.906 | 0.801 | 0.840 | 4.6 | 7.3 | 339.8 | 3065 |
| Comparative | B1 | 0.901 | 0.805 | 0.848 | <u>5.1</u> | 5.9 | 342.8 | 3068 |
| Example | B2 | 0.905 | 0.801 | 0.862 | <u>7.1</u> | 4.8 | 348.3 | 3075 |

$$\text{Improvement rate of iron loss of scoring} = \frac{P_{17/50}(\text{before scoring}) - P_{17/50}(\text{after scoring} - \text{after annealing})}{P_{17/50}(\text{before scoring})}$$

It can be seen from Table 2 that in the Examples A1-A3, $\Delta P_{17/50}\%$ is 5% or less, the improvement rate of iron loss of scoring is more than 6%, the no-load loss of the manufactured distribution transformer is less than 340 W, and the load loss is 3065 W or less. On the other hand, in the Comparative Example B1-B2, $\Delta P_{17/50}\%$ is greater than 5%, the improvement rate of iron loss of scoring is less than 6%, and both the no-load loss and load loss of distribution transformer were higher than those of Examples A1-A3.

Table 3 lists the laser parameters used in the grain-oriented silicon steel with low iron loss of Examples A4-A6 and the conventional silicon steel of Comparative Example B3-B4, and the test results of the iron loss $P_{17/50}$ measured by the 500 mm×500 mm method.

TABLE 3

| | No. | Laser output power P (W) | Repetition frequency fr (kHz) | Pulse width $t_p$ (ns) | Width of beam in the rolling direction a (mm) | Transverse width of beam b (mm) | Laser scan times | Average single-pulse instantaneous peak power density $p_0$ (W/mm$^2$) | $t_P\sqrt{J_F}$ | After laser scoring $P_{17/50}$ (W/kg) Before annealing | After annealing | $\Delta P_{17/50}\%$ (%) |
|---|---|---|---|---|---|---|---|---|---|---|---|---|
| Example | A4 | 20 | 800 | 0.9 | 0.02 | 0.13 | 1 | $1.3 \times 10^7$ | 0.996 | 0.767 | 0.806 | 4.8 |
| | A5 | 1.5 | 600 | 0.03 | 0.1 | 0.1 | 20 | $1.1 \times 10^7$ | 0.005 | 0.801 | 0.805 | 0.5 |
| | A6 | 8 | 400 | 0.6 | 0.1 | 0.2 | 5 | $2.1 \times 10^6$ | 0.214 | 0.762 | 0.801 | 4.9 |
| Comparative | B3 | 10 | 400 | 0.2 | 0.1 | 0.82 | 2 | <u>$1.9 \times 10^6$</u> | <u>0.039</u> | 0.791 | 0.842 | <u>6.1</u> |
| Example | B4 | 15 | 200 | 0.7 | 0.02 | 0.2 | 2 | $3.4 \times 10^7$ | <u>1.082</u> | 0.788 | 0.832 | <u>5.3</u> |

As can be seen from Table 3, in Comparative Examples B3 and B4, the average single-pulse energy flux density $J_F$ and pulse width $t_p$ of the laser did not satisfy the relationship: $0.005 \leq t_p\sqrt{J_F} \leq 1$ and the $\Delta P_{17/50}\%$ was greater than 5%. In Examples A4-A6, the relationship of $0.005 \leq t_p\sqrt{J_F} \leq 1$ is satisfied, and the $\Delta P_{17/50}\%$ is less than 5%.

Table 4 lists the laser parameters used in the grain-oriented silicon steel with low iron loss of Examples A7-A15 and the conventional silicon steel of Comparative Example B5-B10, and the test results of the iron loss $P_{17/50}$ measured by the 500 mm×500 mm method.

TABLE 4

| | No. | Length of spot in the rolling direction (mm) | Transverse length of spot (mm) | Average single-pulse instantaneous peak power density $p_0$ (W/mm²) | $t_p\sqrt{J_F}$ | Laser scan times | Before annealing B8 (T) | $P_{17/50}$ (W/kg) Before annealing | $P_{17/50}$ (W/kg) After annealing | $\Delta P_{17/50}\%$ (%) |
|---|---|---|---|---|---|---|---|---|---|---|
| Example | A7 | 0.04 | 0.2 | 4.0 × 10⁶ | 0.282 | 1 | 1.902 | 0.803 | 0.808 | 0.6 |
| | A8 | 0.012 | 0.2 | 1.3 × 10⁷ | 0.515 | 1 | 1.908 | 0.801 | 0.803 | 0.2 |
| | A9 | 0.01 | 0.3 | 1.1 × 10⁷ | 0.461 | 1 | 1.912 | 0.812 | 0.813 | 0.1 |
| | A10 | 0.04 | 0.2 | 4.0 × 10⁷ | 0.282 | 2 | 1.901 | 0.797 | 0.802 | 0.6 |
| | A11 | 0.012 | 0.2 | 1.3 × 10⁷ | 0.515 | 3 | 1.901 | 0.791 | 0.799 | 1.0 |
| | A12 | 0.012 | 1.0 | 2.7 × 10⁶ | 0.230 | 1 | 1.915 | 0.821 | 0.821 | 0.0 |
| | A13 | 0.012 | 0.2 | 1.3 × 10⁷ | 0.515 | 1 | 1.9 | 0.788 | 0.796 | 1.0 |
| | A14 | 0.012 | 0.2 | 1.3 × 10⁷ | 0.515 | 1 | 1.913 | 0.823 | 0.825 | 0.2 |
| | A15 | 0.012 | 0.2 | 1.3 × 10⁷ | 0.515 | 1 | 1.911 | 0.822 | 0.823 | 0.1 |
| Comparative Example | B5 | 0.012 | 0.2 | 1.3 × 10⁷ | 0.515 | 1 | 1.911 | 0.831 | 0.842 | 1.3 |
| | B6 | 0.008 | 0.2 | 2.0 × 10⁷ | 0.631 | 1 | 1.917 | 0.838 | 0.845 | 0.8 |
| | B7 | 0.012 | 0.2 | 1.3 × 10⁷ | 0.515 | 2 | 1.897 | 0.782 | 0.793 | 1.4 |
| | B8 | 0.012 | 0.2 | 1.3 × 10⁷ | 0.515 | 2 | 1.918 | 0.837 | 0.841 | 0.5 |
| | B9 | 0.012 | 0.5 | 5.3 × 10⁶ | 0.326 | 4 | 1.898 | 0.783 | 0.798 | 1.9 |
| | B10 | 0.012 | 1.2 | 2.2 × 10⁶ | 0.210 | 1 | 1.919 | 0.839 | 0.841 | 0.2 |

As can be seen from Table 4, the parameters in the laser process and the surface scoring process of the grain-oriented silicon steel with low iron loss of Examples A7-A15 are within the scope defined by the present invention. That is to say, in the grain-oriented silicon steel with low iron loss of Examples A7-A15, the groove has a width of 10 to 60 μm and a depth of 5 to 40 μm, the spacing between adjacent grooves is 1 to 10 mm, an angle formed between the groove and the width direction of the steel sheet is not more than 30°, the average single-pulse instantaneous peak power density of the laser is not less than $2.0 \times 10^6$ W/mm², and the average single-pulse energy flux density $J_F$ and the pulse width $t_p$ of the laser satisfy the following relationship: $0.005 \leq t_p\sqrt{J_F} \leq 1$. Therefore, the grain-oriented silicon steel with low iron loss of each Example has good performance, a magnetic induction B8 of 1.90 T or more, and iron losses $P_{17/50}$ before and after annealing of 0.825 W/kg or less. On the other hand, the conventional silicon steel of Comparative Example B5-B9 is inferior in performance to Examples A7-A15 of the present invention.

The grain-oriented silicon steel with low iron loss of Examples A16-A19 and the conventional silicon steel of Comparative Examples B11-B13 were tested for iron loss $P_{17/50}$ by the 500 mm×500 mm method, and subjected to a continuous salt spray test for 7 hr according to the IEC68-2-11 standard. The corrosion resistance characteristics of the surface of the silicon steel sheets were evaluated. The test results obtained are shown in Table 5.

TABLE 5

| | No. | Length of spot in the rolling direction (mm) | Transverse length of spot (mm) | Average single-pulse instantaneous peak power density $p_0$ (W/mm²) | $t_p\sqrt{J_F}$ | Laser scan times | Before annealing B8 (T) | $P_{17/50}$ (W/kg) Before annealing | $P_{17/50}$ (W/kg) After annealing | $\Delta P_{17/50}\%$ (%) | Rust area (%) |
|---|---|---|---|---|---|---|---|---|---|---|---|
| Example | A16 | 0.055 | 0.2 | 2.9 × 10⁶ | 0.241 | 1 | 1.905 | 0.885 | 0.901 | 1.8 | 2 |
| | A17 | 0.045 | 0.2 | 3.5 × 10⁶ | 0.266 | 1 | 1.911 | 0.891 | 0.905 | 1.5 | 1 |
| | A18 | 0.036 | 0.2 | 4.4 × 10⁶ | 0.297 | 1 | 1.912 | 0.879 | 0.890 | 1.2 | 0 |
| | A19 | 0.018 | 0.2 | 8.8 × 10⁶ | 0.421 | 1 | 1.915 | 0.868 | 0.873 | 0.6 | 0 |
| Comparative Example | B11 | 0.056 | 0.2 | 2.8 × 10⁶ | 0.238 | 1 | 1.903 | 0.873 | 0.882 | 1.0 | 5 |
| | B12 | 0.059 | 0.2 | 2.7 × 10⁶ | 0.232 | 1 | 1.901 | 0.877 | 0.890 | 1.5 | 6 |
| | B13 | 0.064 | 0.2 | 2.5 × 10⁶ | 0.223 | 2 | 1.900 | 0.866 | 0.879 | 1.5 | 10 |

From Table 5, and if necessary, in conjunction with Table 1, it can be seen that since the groove width of Examples A16-A19 of the present invention is 60 μm or less, the rust area of the silicon steel sheet in the salt spray test is 2% or less, indicating that the grain-oriented silicon steel with low iron loss of each Example of the present invention is excellent in corrosion resistance. On the other hand, since the groove width of Comparative Examples B11-B13 is more than 60 μm, the corrosion resistance of the silicon steel sheet is greatly attenuated.

FIG. 1 shows the local stress field produced by the mechanical scoring of the prior art. As can be seen from FIG. 1, since it is necessary to apply a mechanical stress greater than the tensile strength on the silicon steel sheet substrate to form a groove on the surface, the pressure value required generally exceeds 200 MPa, and the distribution of the stress field throughout the entire thickness direction of the silicon steel sheet in the rolling direction of the steel sheet greatly exceeds the deformation region of the score. A large number of sub-magnetic domains are generated in the residual stress region after processing, which increases the hysteresis loss and reduces the magnetic induction characteristics of a silicon steel sheet. Therefore, the silicon steel in prior art cannot be directly applied to the manufacture of a laminated core transformer.

Figure 2:
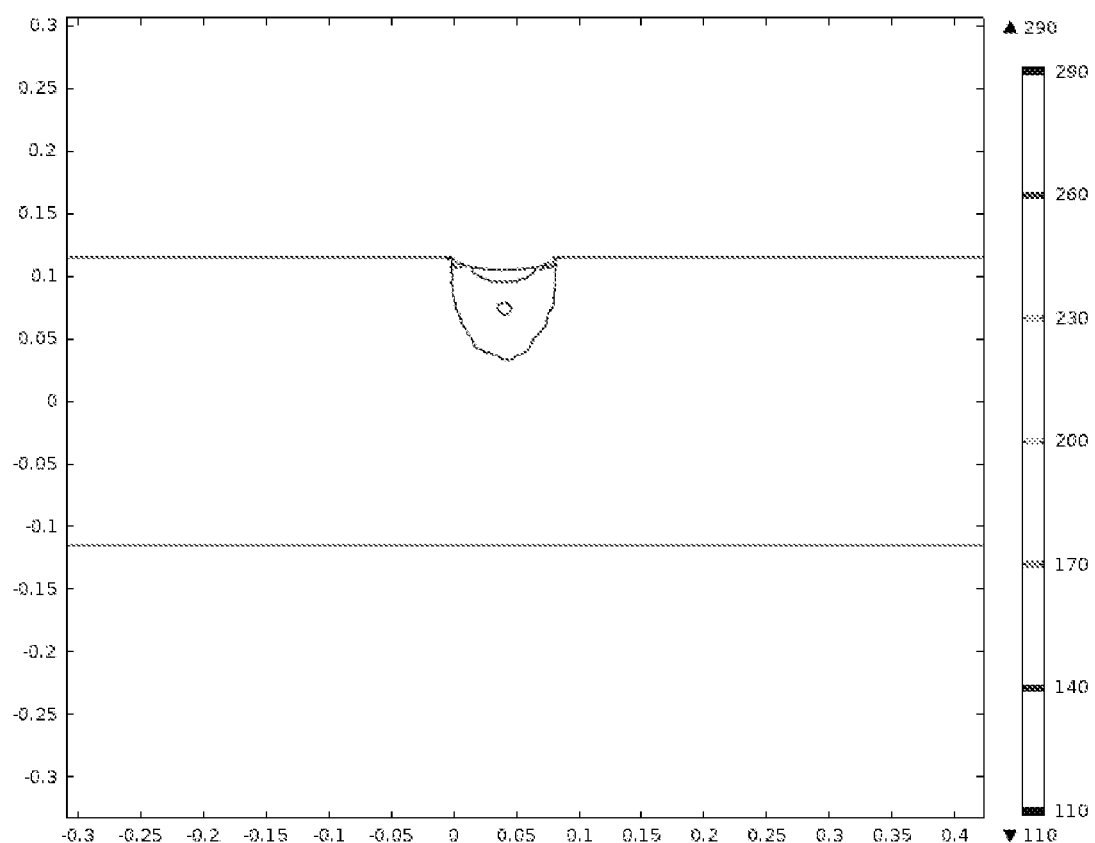
FIG. 2 shows the stress distribution in the groove of the grain-oriented silicon steel with low iron loss according to the present invention.

FIG. 2 shows the stress distribution in the groove of the grain-oriented silicon steel with low iron loss according to the present invention. As can be seen from FIG. 2, since the present invention uses a high-energy pulsed laser to perform a heat-resistant scoring, the distribution of stress in the vicinity of the groove is very limited and the area affected by the stress is greatly reduced. Therefore, the iron loss of the silicon steel sheet after stress-relief annealing is not significantly increased. Therefore, the grain-oriented silicon steel with low iron loss according to the present invention can be applied to the manufacture of a wound core and a laminated core transformer.

Figure 3:
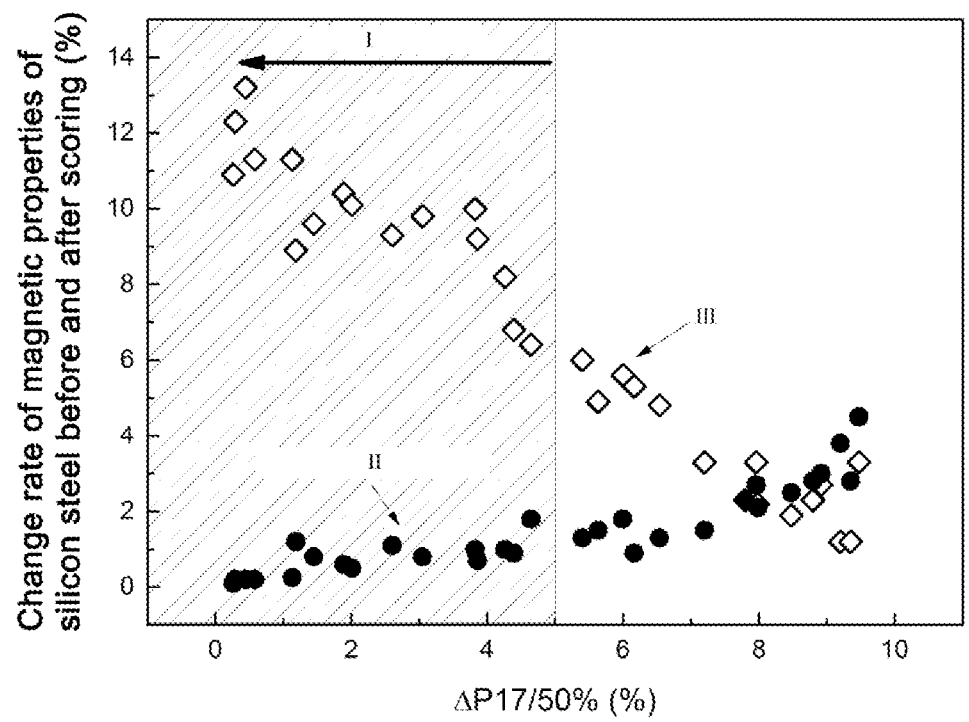
FIG. 3 shows the improvement of the magnetic induction and iron loss of the grain-oriented silicon steel with low iron loss according to the present invention at different relative change rates of iron loss $\Delta P_{17/50}$%.

FIG. 3 shows the improvement of the magnetic induction and iron loss of the grain-oriented silicon steel with low iron loss according to the present invention at different relative change rates of iron loss $\Delta P_{17/50}\%$. As can be seen from FIG. 3, the grain-oriented silicon steel with low iron loss of the present invention in the range of I has a good improvement rate of magnetic induction B8 and an obvious improvement rate of iron loss $P_{17/50}$ (an improvement rate of more than 6%). Therefore, the grain-oriented silicon steel with low iron loss according to the present invention can be used for the manufacture of a wound core transformer, and also can be directly used for the manufacture of a laminated core transformer without stress-relief annealing. In the figure, I indicates that $\Delta P_{17/50}\%$ is in the range of 5% or less, II represents a curve of the improvement rate of the magnetic induction of the grain-oriented silicon steel, and III represents a curve of the improvement rate of the iron loss $P_{17/50}$ of the grain-oriented silicon steel.

Figure 4:
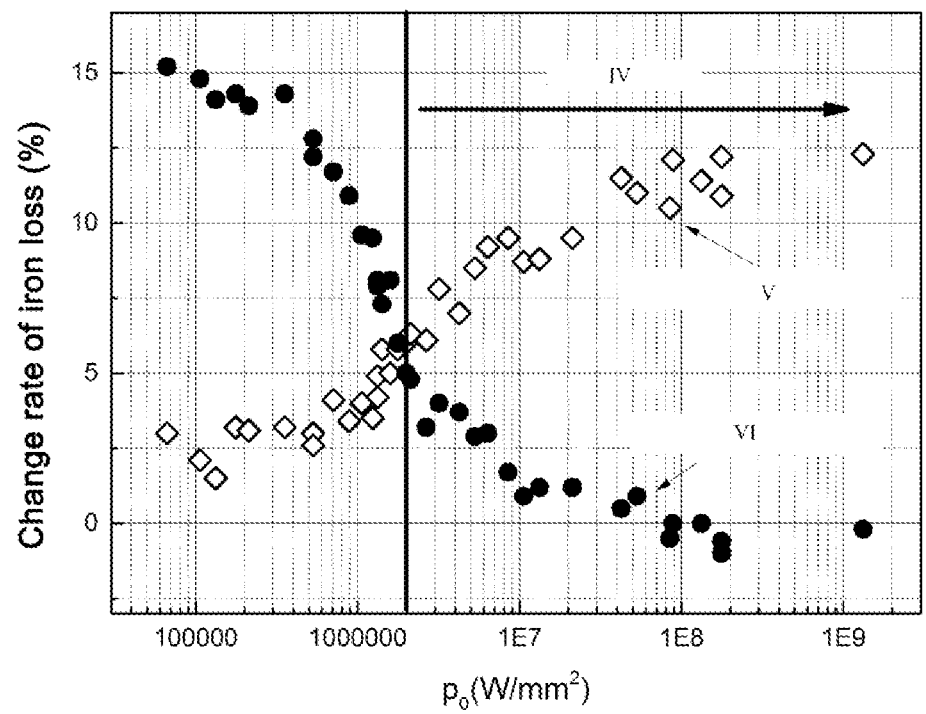
FIG. 4 shows the relative change rate $\Delta P_{17/50}$% and improvement rate of iron loss before and after annealing of the oriented silicon steel with low iron loss of the present invention at different average single-pulse peak power densities $p_0$.

FIG. 4 shows the relative change rate $\Delta P_{17/50}\%$ and improvement rate of iron loss before and after annealing stress-relief of the grain-oriented silicon steel with low iron loss of the present invention at different average single-pulse peak power densities $p_0$. It can be seen from FIG. 4 that, when it is in the IV range, the grain-oriented silicon steel with low iron loss according to the present invention has a relative change rate of iron loss $\Delta P_{17/50}\%$ before and after the stress-relief annealing of 5% or less, and the improvement rate of iron loss is high. In the figure, IV indicates that the average single-pulse peak power density $p_0$ is $2.0 \times 10^6$ W/mm² or more, V represents the improvement rate of iron loss of the grain-oriented silicon steel, and VI represents the relative change rate of iron loss $\Delta P_{17/50}\%$ before and after the stress relief annealing.

Figure 5:
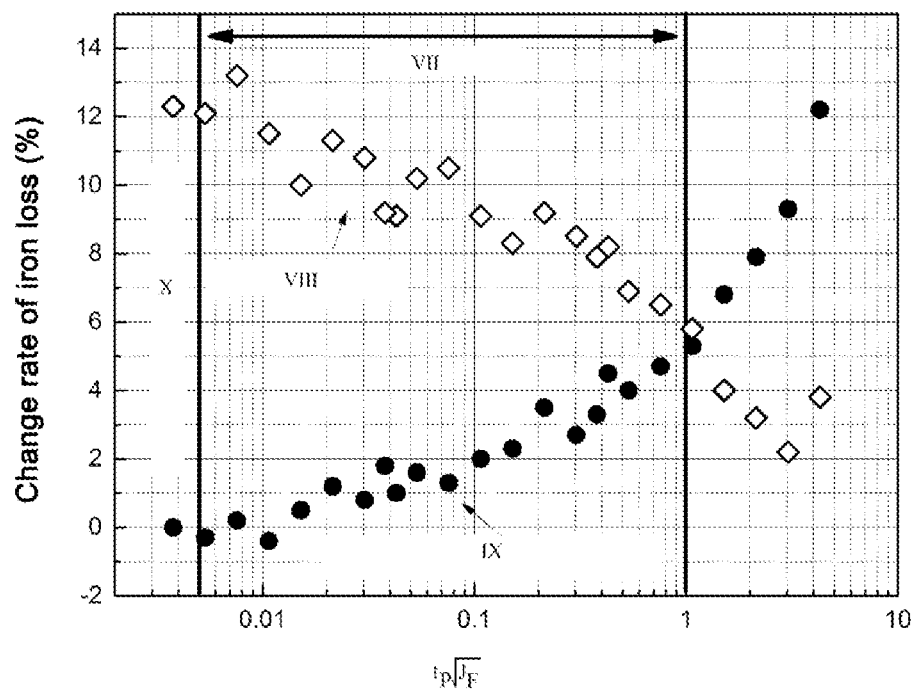
FIG. 5 shows the relative change rate $\Delta P_{17/50}$% and improvement rate of iron loss before and after stress-relief annealing of the grain-oriented silicon steel with low iron loss of the present invention at different $t_p\sqrt{J_F}$.

FIG. 5 shows the relative change rate $\Delta P_{17/50}\%$ and improvement rate of iron loss before and after stress-relief annealing of the grain-oriented silicon steel with low iron loss of the present invention at different $t_p\sqrt{J_F}$. It can be seen from FIG. 5 that, when it is in the VII range, the grain-oriented silicon steel with low iron loss according to the present invention has a relative change rate of iron loss $\Delta P_{17/50}\%$ before and after the stress-relief annealing of 5% or less, and the improvement rate of iron loss is high. In the figure, VII indicates that the average single-pulse energy flux density $J_F$ and the pulse width $t_p$ of the laser satisfy the relationship of $0.005 \leq t_p\sqrt{J_F} \leq 1$, VIII represents the improvement rate of iron loss of the grain-oriented silicon steel, IX represents the relative change rate of iron loss $\Delta P_{17/50}\%$ before and after the stress relief annealing, and X represents the laser processing area.

It should be noted that the above are only specific examples of the present invention. It will be apparent that the invention is not limited to the above examples but has many similar variations. All modifications derived or conceived by those skilled in the art from the disclosure of the present invention should fall within the scope of the present invention.

The invention claimed is:

1. A grain-oriented silicon steel with low iron loss, wherein the grain-oriented silicon steel comprises a plurality of grooves on a surface of said grain-oriented silicon steel, and each groove is 10-60 μm in width and 5-40 μm in depth, and the spacing between adjacent grooves is 1-10 mm; and wherein the grain-oriented silicon steel has $\Delta P_{17/50}\%$, a relative change rate of iron loss before and after stress-relief annealing, of 5% or less, and wherein $$\Delta P_{17/50}\% = \frac{P_{17/50}(\text{after annealing}) - P_{17/50}(\text{before annealing})}{P_{17/50}(\text{after annealing})},$$

$P_{17/50}$ is an iron loss of a grain-oriented silicon steel sheet, in unit of W/kg, and wherein the $P_{17/50}$ after annealing $> P_{17/50}$ before annealing.

2. The grain-oriented silicon steel with low iron loss of claim 1, wherein an angle formed between the groove and the width direction of a steel sheet is not more than 30°.

3. The grain-oriented silicon steel with low iron loss of claim 1, wherein the grooves are formed by laser scoring.

4. The grain-oriented silicon steel with low iron loss of claim 1, wherein one or both the surfaces of the grain-oriented silicon steel have the grooves.

5. A method for producing a grain-oriented silicon steel with low iron loss, comprising the steps of scoring a surface of the grain-oriented silicon steel with a laser to form grooves, and each groove is 10-60 μm in width and 5-40 μm in depth, and the spacing between adjacent grooves is 1-10 mm;

wherein an average single-pulse energy flux density $J_F$ and the pulse width $t_p$ of the laser satisfy the following relationship:

$$0.005 \leq t_p\sqrt{J_F} \leq 1, \text{and}$$

wherein the unit of the pulse width $t_p$ is ns; and the unit of $J_F$ is J/mm², and wherein the average single pulse energy flux density $J^F$ is expressed as:

$$J_F = \frac{P}{f_r S},$$

wherein P is the output power of the laser in W; $f_r$ is the repetition frequency of laser in Hz; S is the spot area in mm$^2$.

6. The method for producing a grain-oriented silicon steel with low iron loss of claim 5, wherein an angle formed between the groove and the width direction of a steel sheet is not more than 30°.

7. The method for producing a grain-oriented silicon steel with low iron loss of claim 5, wherein the laser is one or more selected from a $CO_2$ laser, a solid laser, and a fiber optic laser.

8. The method for producing a grain-oriented silicon steel with low iron loss of claim 5, wherein the laser has an average single-pulse instantaneous peak power density of $2.0 \times 10^6$ W/mm$^2$ or more.

9. The method for producing a grain-oriented silicon steel with low iron loss of claim 5, wherein the laser has a wavelength of 1066 nm or less.

* * * * *